US012574701B2

(12) United States Patent
Condon et al.

(10) Patent No.: US 12,574,701 B2
(45) Date of Patent: Mar. 10, 2026

(54) SYSTEMS AND METHODS FOR DIGITAL GEOCACHING

(71) Applicant: DISH Network L.L.C., Englewood, CO (US)

(72) Inventors: Caroline Condon, Denver, CO (US); Luke E. VanDuyn, Conifer, CO (US); Amber Bellerjeau, Littleton, CO (US)

(73) Assignee: DISH Network L.L.C., Englewood, CO (US)

( * ) Notice: Subject to any disclaimer, the term of this patent is extended or adjusted under 35 U.S.C. 154(b) by 604 days.

(21) Appl. No.: 18/085,943

(22) Filed: Dec. 21, 2022

(65) Prior Publication Data

US 2024/0214767 A1 Jun. 27, 2024

(51) Int. Cl.
| | |
|---|---|
| *H04W 24/00* | (2009.01) |
| *G06Q 30/0601* | (2023.01) |
| *H04W 4/021* | (2018.01) |
| *H04W 4/80* | (2018.01) |

(52) U.S. Cl.
CPC ........ *H04W 4/021* (2013.01); *G06Q 30/0631* (2013.01); *H04W 4/80* (2018.02)

(58) Field of Classification Search
CPC ..... H04W 4/021; H04W 4/80; G06Q 30/0631
USPC .............................................. 455/456.3, 3.06
See application file for complete search history.

(56) References Cited

U.S. PATENT DOCUMENTS

| | | | | |
|---|---|---|---|---|
| 9,189,772 B2 * | 11/2015 | Levit | ................... | G06Q 10/103 |
| 9,264,484 B1 * | 2/2016 | Moxley | ................... | H04W 4/21 |
| 10,275,809 B2 * | 4/2019 | Butler | ................... | G06Q 20/18 |
| 10,387,459 B2 * | 8/2019 | Patel | ................... | G06F 16/29 |
| 11,477,005 B1 * | 10/2022 | Lupowitz | .............. | H04L 9/3213 |
| 12,045,811 B2 * | 7/2024 | Greco | ................... | G06Q 20/10 |
| 2009/0053992 A1 * | 2/2009 | Butler | ................ | H04L 67/1021 |
| | | | | 455/3.06 |
| 2012/0190386 A1 * | 7/2012 | Anderson | .............. | G01S 19/14 |
| | | | | 455/456.3 |
| 2018/0157678 A1 * | 6/2018 | Patel | ................... | G06F 16/9537 |
| 2018/0224560 A1 * | 8/2018 | Xi | ........................... | G06F 16/40 |
| 2018/0349845 A1 * | 12/2018 | Klein | ................... | H04B 17/318 |
| 2019/0034923 A1 * | 1/2019 | Greco | ................ | G06Q 20/383 |
| 2019/0050806 A1 * | 2/2019 | Klein | ...................... | H04W 4/70 |
| 2019/0116231 A1 * | 4/2019 | Frazier | ................. | H04W 4/023 |
| 2020/0220746 A1 * | 7/2020 | Shribman | ............. | H04W 48/18 |
| 2022/0198034 A1 * | 6/2022 | Rodriguez | ............. | H04L 9/008 |
| 2022/0253837 A1 * | 8/2022 | Schneider | ........... | G06Q 20/065 |
| 2023/0009304 A1 * | 1/2023 | Jakobsson | .......... | G06Q 30/0241 |
| 2023/0237349 A1 * | 7/2023 | Donoho | ................. | G06Q 40/02 |
| | | | | 706/46 |
| 2023/0246803 A1 * | 8/2023 | Lupowitz | ............... | G06Q 20/36 |
| 2023/0283489 A1 * | 9/2023 | Lupowitz | ............. | H04L 9/3213 |
| | | | | 713/159 |
| 2023/0376581 A1 * | 11/2023 | Shear | ................... | G06V 40/45 |
| 2024/0046318 A1 * | 2/2024 | Muriqi | .............. | G06Q 30/0273 |

(Continued)

*Primary Examiner* — Marceau Milord

(74) *Attorney, Agent, or Firm* — Perkins Coie LLP

(57) ABSTRACT

A method for geocaching digital content, the method including: loading contents on a digital geocache device, wherein the digital geocache device is not accessible via the internet; placing the digital geocache device at a selected location; registering the location of the digital geocache device on a geocache registry; receiving a request from a user device to access the contents of the digital geocache device; and transferring one or more of the contents from the digital geocache device to the user device.

18 Claims, 4 Drawing Sheets

300

302 Loading Content on Digital Geocache Device

304 Placing the Geocache Device

306 Registering the Location of the Geocache Device

308 Receiving Request from User Device

310 Transferring Contents to the User Device

(56) References Cited

U.S. PATENT DOCUMENTS

| | | | | |
|---|---|---|---|---|
| 2024/0370865 A1* | 11/2024 | Bernardi | ................. | G06Q 20/36 |
| 2024/0378631 A1* | 11/2024 | Cristache | ................ | G06F 21/31 |
| 2025/0227139 A1* | 7/2025 | Shribman | ............. | H04L 61/256 |

* cited by examiner

300

302 Loading Content on Digital Geocache Device

304 Placing the Geocache Device

306 Registering the Location of the Geocache Device

308 Receiving Request from User Device

310 Transferring Contents to the User Device

400

| Input devices 420 | Display 430 | Other I/O 440 |

CPU 410

Memory 450

Program memory 460

Operating system 462

Digital Geocaching Application 464

Other applications 466

Data memory 470

SYSTEMS AND METHODS FOR DIGITAL GEOCACHING

BACKGROUND

Geocaching is an activity, in which participants use a Global Positioning System (GPS) receiver or mobile device to find containers, called "geocaches," at specific locations marked by coordinates. A typical geocache is a small waterproof container containing a logbook and sometimes items for trading, such as toys, trinkets, and/or coins, usually of sentimental value rather than monetary value. The geocacher signs and dates the logbook, in order to show that they found the cache. After signing the log, and exchanging e.g., trinkets the geocache is placed back where the person found it for the next geocacher to find it.

SUMMARY

In some aspects, the techniques described herein relate to a method for geocaching digital content, the method including: loading content on a digital geocache device, wherein the digital geocache device is not accessible via the internet; placing the geocache at a selected location; registering the location of the digital geocache device on a geocache registry; receiving a request from a user device to access contents of the digital geocache; and transferring one or more contents from the digital geocache device to the user device.

In some aspects, the techniques described herein relate to a method, further including powering the geocache device with solar panels.

In some aspects, the techniques described herein relate to a method, wherein the digital geocache device includes short range wireless communication capabilities.

In some aspects, the techniques described herein relate to a method, wherein the digital geocache device is accessible via the internet only for a creator of the digital geocache.

In some aspects, the techniques described herein relate to a method, wherein the content includes one or more of photos, a restaurant list, restaurant recommendations, and a playlist of local artists.

In some aspects, the techniques described herein relate to a method, further including transferring a non-fungible token to the user device.

In some aspects, the techniques described herein relate to a digital geocache device, including: one or more processors; and one or more memory devices having stored thereon instructions that when executed by the one or more processors cause the one or more processors to: load content on a digital geocache device, wherein the digital geocache device is not accessible via the internet; place the geocache at a selected location; register the location of the digital geocache device on a geocache registry; receive a request from a user device to access contents of the digital geocache; and transfer one or more contents from the digital geocache device to the user device.

In some aspects, the techniques described herein relate to a device, further including powering the geocache device with solar panels.

In some aspects, the techniques described herein relate to a device, wherein the digital geocache device includes short range wireless communication capabilities.

In some aspects, the techniques described herein relate to a device, wherein the digital geocache device is accessible via the internet only for a creator of the digital geocache.

In some aspects, the techniques described herein relate to a device, wherein the content includes one or more of photos, a restaurant list, restaurant recommendations, and a playlist of local artists.

In some aspects, the techniques described herein relate to a device, further including transferring a non-fungible token to the user device.

In some aspects, the techniques described herein relate to one or more non-transitory computer-readable media storing computer-executable instructions that, when executed by one or more processors, cause the one or more processors to perform operations including: loading content on a digital geocache device, wherein the digital geocache device is not accessible via the internet; placing the geocache at a selected location; registering the location of the digital geocache device on a geocache registry; receiving a request from a user device to access contents of the digital geocache; and transferring one or more contents from the digital geocache device to the user device.

In some aspects, the techniques described herein relate to one or more non-transitory computer-readable media, further including powering the geocache device with solar panels.

In some aspects, the techniques described herein relate to one or more non-transitory computer-readable media, wherein the digital geocache device includes short range wireless communication capabilities.

In some aspects, the techniques described herein relate to one or more non-transitory computer-readable media, wherein the digital geocache device is accessible via the internet only for a creator of the digital geocache.

In some aspects, the techniques described herein relate to one or more non-transitory computer-readable media, wherein the content includes one or more of photos, a restaurant list, restaurant recommendations, and a playlist of local artists.

In some aspects, the techniques described herein relate to one or more non-transitory computer-readable media, further including transferring a non-fungible token to the user device.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
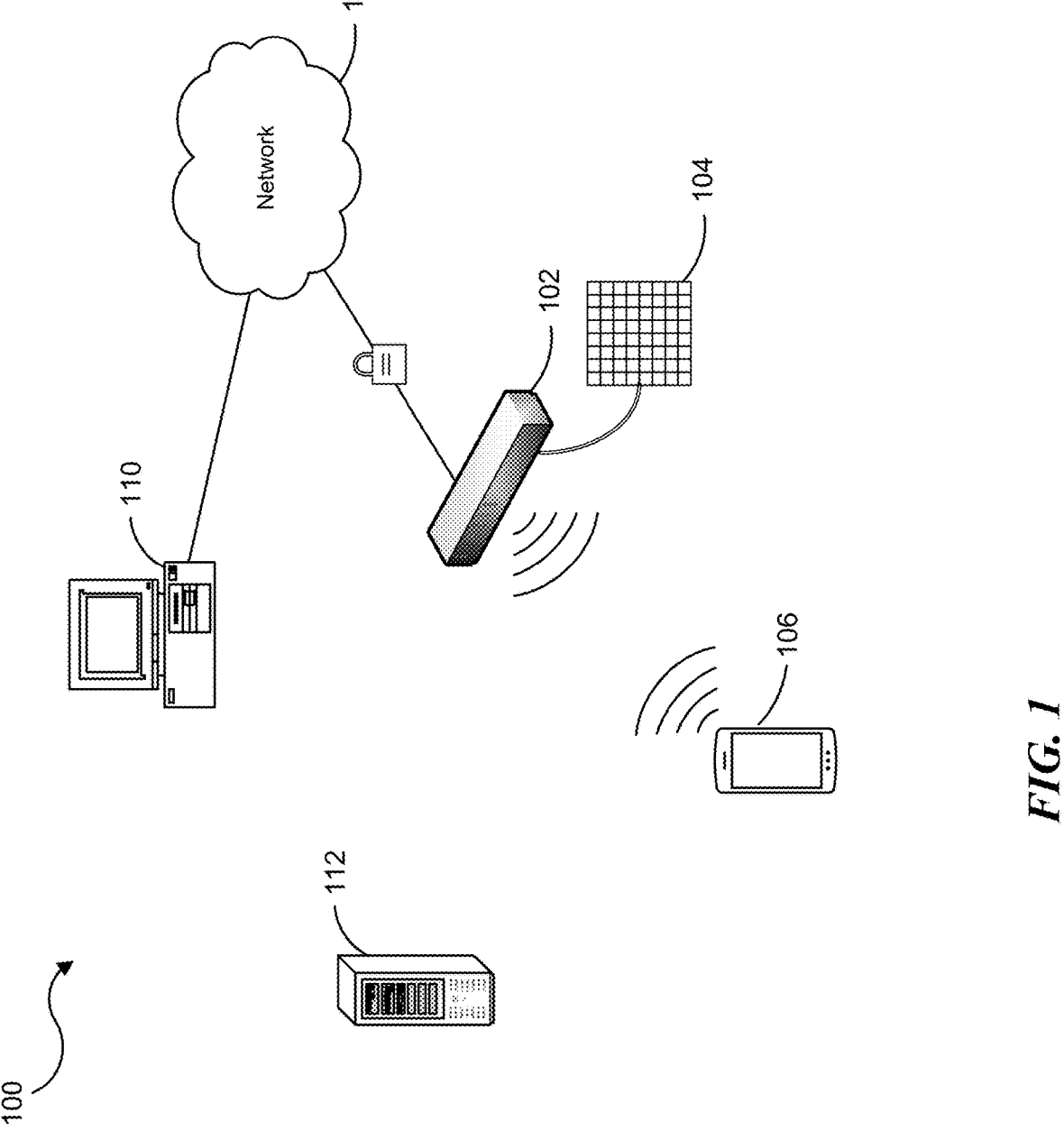
FIG. 1 is a diagram illustrating an overview of a system for digital geocaching according to embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates an example simplified block diagram of a system 100 for geocaching digital content. The system can include a digital geocache device 102 having one or more processors and one or more memory devices. The digital geocache device 102 can be loaded with various digital content items, such as photos, restaurant lists, restaurant recommendations, playlists of local artists, etc. In some embodiments, the digital geocache device 102 can also contain Non-Fungible Tokens (NFT) that can be downloaded as proof that a geocacher was actually at the location of the device. Furthermore, a user can sign a virtual logbook and/or upload contents, such as photos and/or tokens to the digital geocache device 102 from the users mobile device 106.

The digital geocache device 102 can be placed at almost any location that a traditional geocache container can be placed. The digital geocache device 102 can include batteries and/or solar panels 104. In some embodiments, the device can be powered from an electric utility where available. In some embodiments, the digital geocache device 102 can be weather resistant such that it can be placed outdoors. Once the digital geocache device 102 is loaded with content and placed at a selected location, the location of the digital geocache device 102 can be registered on a geocache registry 112, such as a website.

In general, the digital geocaching device 102 is not accessible via the internet and is only accessible via short range wireless communication, such as WiFi, Bluetooth®, or Near-Field Communication (NFC) protocols. Thus, for a user to download contents to their mobile device 106 they must be physically within e.g., Bluetooth® range of the device. The user device 108 can be a mobile device, such as a cellular telephone, a tablet computer, a smartwatch, or any other mobile device. In some embodiments, the digital geocache can have limited internet 108 connection for an administrator device 110 to maintain the digital contents of the digital geocache device.

In some embodiments, how close (i.e., proximity) the geocacher must be to the device 102 for it to register as being "discovered" can be owner adjustable, e.g., a difficulty setting. For example, the difficulty setting can be set for 20 feet, 5 feet, 6 inches, etc. In some cases, the difficulty can be set by the inherent range of the communication protocol, such as Bluetooth® at approximately 30 feet or NFC at approximately 4 inches.

As mentioned above, the digital geocache device 102 can also contain NFTs that can be downloaded as proof that a geocacher was actually at the location of the device. A NFT is a unique unit of data employing technology that allows digital content to be logged and authenticated using blockchains. Once content is logged onto the blockchain, every transaction associated with the NFT, from transfers to sales, is recorded on the blockchain. A blockchain is a distributed database of records, called blocks, that are shared among nodes in a decentralized peer-to-peer computer network. Blockchains are also referred to as distributed ledger technology (DLT). The blocks are linked and secured using cryptography to provide a secure and decentralized record of transactions. Each block typically contains a cryptographic hash of the previous block, a timestamp, and transaction data. New blocks added to a blockchain are stored chronologically. After a block has been added to the end of a blockchain, it is essentially impossible to alter the contents of the block because a majority of the network must reach a consensus to do so. Each block contains its own hash code, along with the hash code of the preceding block. If the information in a block is edited in any way, the hash codes change as well, which would no longer agree with the codes stored in all the other computers on the network. NFTs have unique identification codes and metadata that distinguish them from each other. Thus, unlike cryptocurrencies, NFTs are not fungible and cannot be traded as equivalent. Using the blockchain provides for an easily accessible ledger of provenance. Although the disclosed systems are described as using NFT technology to track and validate geocachers who visit a digital geocache, other technologies can be used as well, such as for example, secure encrypted metadata that captures e.g., date, geocacher identity, location, etc.

Figure 2:
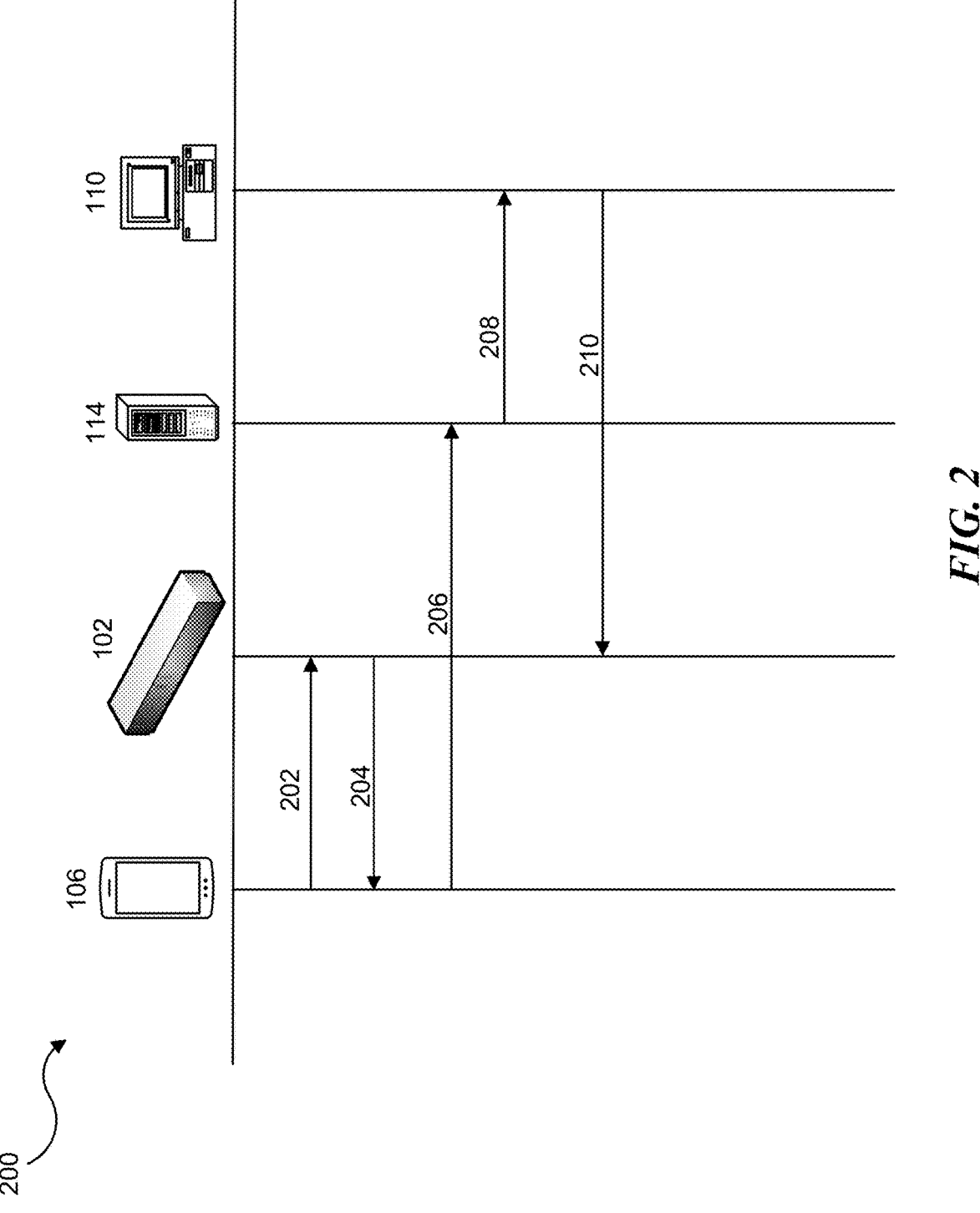
FIG. 2 is an entity diagram illustrating the information flow between system components in order to create and register an NFT.

FIG. 2 is an entity diagram 200 illustrating the information flow between system components, e.g., the digital geocache device 102, mobile device 106, administrator device 110, and a third party device 114, in order to create and register an NFT. In some embodiments, the digital geocache device 102 receives an NFT download request 202 from a mobile device 106. The geocache device 102 sends 206 the next available NFT to the mobile device 106. Because the geocache device 102 is generally not connected to the internet, the mobile device 106 sends a request 206 to a third party ledger 114 to log and verify the NFT when the mobile device 106 is next in range of a network. Once the NFT is logged, the third party ledger 114 sends a message 208 to the administrator device 110 to update the NFT records which can be downloaded 210 to the geocache device 102.

Figure 3:
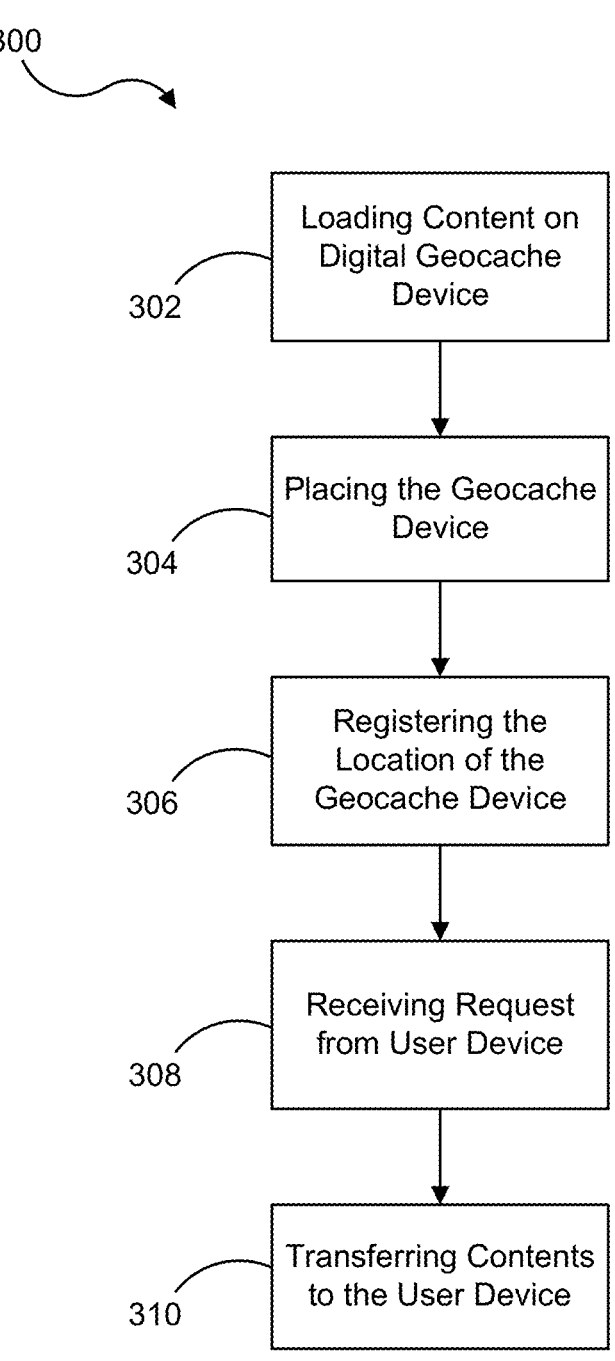
FIG. 3 is a flow diagram showing a method for geocaching digital content according to some embodiments of the disclosed technology.

FIG. 3 is a flow diagram showing a representative method of operation 300 of a processor-based system for geocaching digital content. The method 300 can include loading content on a digital geocache device, at step 302. In some embodiments, the digital geocache device is not accessible via the internet. At step 304, the digital geocache device is placed at a selected location. The method 300 can include registering the location of the digital geocache device on a geocache registry, at step 306. At step 308, a request is received from a user device to access the contents of the digital geocache and at step 310 one or more of the contents are transferred from the digital geocache device to the user device.

Suitable System

The techniques disclosed herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 4:
FIG. 4 is a block diagram illustrating an overview of devices on which some implementations can operate.
Figure 4:
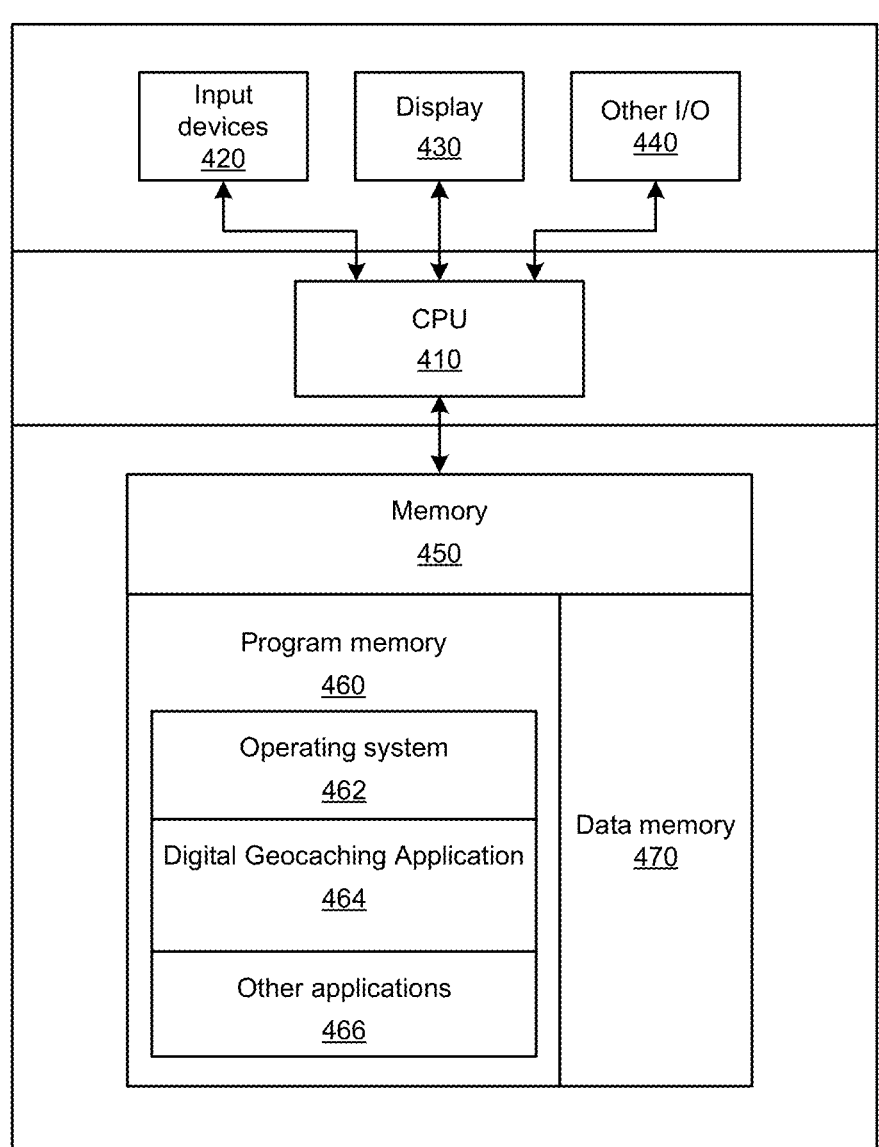

FIG. 4 is a block diagram illustrating an overview of devices on which some implementations of the disclosed technology can operate. The devices can comprise hardware components of a device 400. Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a user. In some implementations, display 430 includes the input device as part of the display, such as when the input device is a touchscreen or is equipped with an eye direction monitoring system. In some implementations, the display is separate from the input device. Examples of display devices are: televisions; mobile devices; an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462, a digital geocaching application 464, and other application programs 466. Memory 450 can also include data memory 470 that can include content items, etc., which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIG. 4 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term.

Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for geocaching digital content, the method comprising:
    loading contents on a digital geocache device, wherein the digital geocache device is not accessible via an internet;
    placing the digital geocache device at a physical location;
    registering the physical location of the digital geocache device on a geocache registry;
    receiving a request from a user device to access the contents of the digital geocache device;
    determining the user device is within a threshold distance of the physical location of the digital geocache device; and
    in response to the user device being within the threshold distance, transferring one or more of the contents from the digital geocache device to the user device.

2. The method of claim 1, further comprising powering the digital geocache device with solar panels.

3. The method of claim 1, wherein the digital geocache device includes short range wireless communication capabilities.

4. The method of claim 1, wherein the digital geocache device is accessible via the internet only for a creator of the digital geocache device.

5. The method of claim 1, wherein the contents comprises one or more of photos, a restaurant list, restaurant recommendations, and a playlist of local artists.

6. The method of claim 1, further comprising transferring a non-fungible token to the user device.

7. A digital geocache device, comprising:
    one or more processors; and
    one or more memory devices having stored thereon instructions that when executed by the one or more processors cause the one or more processors to:
        load contents on the digital geocache device, wherein the digital geocache device is not accessible via an internet;
        place the digital geocache device at a physical location;
        register the physical location of the digital geocache device on a geocache registry;
        receive a request from a user device to access the contents of the digital geocache device;
        determine the user device is within a threshold distance of the physical location of the digital geocache device; and in response to the user device being within the threshold distance, transfer one or more of the contents from the digital geocache device to the user device.

8. The digital geocache device of claim 7, further comprising powering the digital geocache device with solar panels.

9. The digital geocache device of claim 7, wherein the digital geocache device includes short range wireless communication capabilities.

10. The digital geocache device of claim 7, wherein the digital geocache device is accessible via the internet only for a creator of the digital geocache device.

11. The digital geocache device of claim 7, wherein the contents comprises one or more of photos, a restaurant list, restaurant recommendations, and a playlist of local artists.

12. The digital geocache device of claim 7, further comprising transferring a non-fungible token to the user device.

13. One or more non-transitory computer-readable media storing computer-executable instructions that, when executed by one or more processors, cause the one or more processors to perform operations comprising:
    loading contents on a digital geocache device, wherein the digital geocache device is not accessible via an internet;
    placing the digital geocache device at a physical location;
    registering the physical location of the digital geocache device on a geocache registry;
    receiving a request from a user device to access the contents of the digital geocache device;
    determining the user device is within a threshold distance of the physical location of the digital geocache device; and
    in response to the user device being within the threshold distance, transferring one or more of the contents from the digital geocache device to the user device.

14. The one or more non-transitory computer-readable media of claim 13, further comprising powering the digital geocache device with solar panels.

15. The one or more non-transitory computer-readable media of claim 13, wherein the digital geocache device includes short range wireless communication capabilities.

16. The one or more non-transitory computer-readable media of claim 13, wherein the digital geocache device is accessible via the internet only for a creator of the digital geocache device.

17. The one or more non-transitory computer-readable media of claim 13, wherein the contents comprises one or more of photos, a restaurant list, restaurant recommendations, and a playlist of local artists.

18. The one or more non-transitory computer-readable media of claim 13, further comprising transferring a non-fungible token to the user device.

* * * * *